US011708090B2

(12) United States Patent
Trask et al.

(10) Patent No.: US 11,708,090 B2
(45) Date of Patent: Jul. 25, 2023

(54) VEHICLE BEHAVIORAL MONITORING

(71) Applicant: GM GLOBAL TECHNOLOGY OPERATIONS LLC, Detroit, MI (US)

(72) Inventors: Simon J. Trask, Bloomfield, MI (US); Scott D. Thomas, Novi, MI (US); Joseph R. Abrash, Bloomfield Hills, MI (US); Tracy Gonzalez, Troy, MI (US); Dustin Knapp, Lincoln Park, MI (US); Kaleb R. Lepak, Clarkston, MI (US); Eva Rousseau, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 299 days.

(21) Appl. No.: 17/068,065

(22) Filed: Oct. 12, 2020

(65) Prior Publication Data

US 2022/0111867 A1 Apr. 14, 2022

(51) Int. Cl.
| | |
|---|---|
| *B60W 60/00* | (2020.01) |
| *G08G 1/16* | (2006.01) |
| *B60W 40/09* | (2012.01) |
| *B60W 30/095* | (2012.01) |
| *B60W 30/09* | (2012.01) |
| *H04W 4/40* | (2018.01) |
| *B60W 50/14* | (2020.01) |

(52) U.S. Cl.
CPC ........ *B60W 60/0015* (2020.02); *B60W 30/09* (2013.01); *B60W 30/0956* (2013.01); *B60W 40/09* (2013.01); *B60W 50/14* (2013.01); *G08G 1/166* (2013.01); *H04W 4/40* (2018.02); *B60W 2050/143* (2013.01); *B60W 2540/229* (2020.02); *B60W 2552/00* (2020.02); *B60W 2556/45* (2020.02)

(58) Field of Classification Search
CPC ............ B60W 60/0015; B60W 30/09; B60W 30/0956; B60W 40/09; B60W 50/14; B60W 2552/00; B60W 2556/45; B60W 2540/229; B60W 2050/143; H04W 4/40; G08G 1/166
See application file for complete search history.

(56) References Cited

U.S. PATENT DOCUMENTS

| | | | |
|---|---|---|---|
| 2020/0218935 A1* | 7/2020 | Abe ..................... | A61B 5/7275 |
| 2020/0225664 A1* | 7/2020 | Gariepy ............... | G05D 1/0011 |
| 2020/0361453 A1* | 11/2020 | Park ................ | B60W 30/18163 |
| 2021/0061098 A1* | 3/2021 | Parker ................. | G08G 1/0965 |

(Continued)

OTHER PUBLICATIONS

Dong et al., "Driver Inattention Monitoring System for Intelligent Vehicles: A Review", Jun. 2011, IEEE Transactions on Intelligent Transportation Systems, vol. 12, No. 2, DOI 10.1109/TITS.2010.2092770 (Year: 2011).*

(Continued)

*Primary Examiner* — Tarek Elarabi
(74) *Attorney, Agent, or Firm* — Cantor Colburn LLP (57) ABSTRACT

Vehicle behavioral monitoring includes determining a measure of distraction of the operator of a target vehicle, characterizing the type or category of distraction, determining level of risk that the target vehicle poses, and invoking various responses including host vehicle notifications and evasive actions and external notification and information sharing.

14 Claims, 3 Drawing Sheets

(56) References Cited

U.S. PATENT DOCUMENTS

2022/0032924 A1* 2/2022 Jeihani ................ G06K 9/6267

OTHER PUBLICATIONS

McDonald et al., "Classification of Driver Distraction: A Comprehensive Analysis of Feature Generation, Machine Learning, and Input Measures", Sep. 2020, Human Factors, DOI J0.1177/001 872081 9856454 (Year: 2020).*

Atiquzzaman et al., "Real-Time Detection of Drivers' Texting and Eating Behavior Based on Vehicle Dynamics" Transportation Research Part F 58 (Oct. 1, 2018): pp. 594-604.

Avelar et al., "Using SHRP2-Nds Data to Investigate Freeway Operations, Human Factors, and Safety" No. ATLAS-2018-23. ATLAS Center (Mich.), Jul. 4, 2018 (122 pages).

Ersal et al., "Model-Based Analysis and Classification of Driver Distraction Under Secondary Tasks" IEEE Transactions on Intelligent Transportation Systems, vol. 11, No. 3 (Sep. 3, 2010) pp. 692-701.

Kersloot et al., "Steering Entropy as a Measure of Impairment" Presented During the Young Researchers Seminar 2003 (8 pages).

Maybank et al., "Filter For Car Tracking Based on Acceleration and Steering Angle" British Machine Vision Conference 1996 (10 pages).

Taamneh et al., "Data Descriptor: A Multimodal Dataset for Various Forms of Distracted Driving" Scientific Data 4 (Aug. 15, 2017): 170110 (21 pages).

Tango et al., "Real-Time Detection System of Driver Distraction Using Machine Learning" IEEE Transactions on Intelligent Transportation Systems, vol. 14, No. 2 (Jun. 2013) pp. 894-905.

Trask et al., "Effectiveness of Warning Signals in Semi-Autonomous Vehicles" SAE Technical Paper, No. 2019-01-1013, Apr. 2, 2019 (10 pages).

Yadawadkar et al., "Identifying Distracted and Drowsy Drivers Using Naturalistic Driving Data" 2018 IEEE International Conference on Big Data (Big Data) IEEE, Dec. 10, 2018 (pp. 2019-2026).

* cited by examiner

VEHICLE BEHAVIORAL MONITORING

INTRODUCTION

This disclosure is related to situational awareness in road vehicles.

Vehicle systems are known to monitor the region surrounding the vehicle for improving a vehicle operator's situational awareness. Common examples include forward and rear range, range-rate and vision systems. Such systems may be enablers in autonomous and semi-autonomous vehicle controls, for example adaptive cruise controls, assisted parking, lane departure warning, lane keeping and blind spot warnings.

Vehicle systems are proposed to monitor a vehicle operator. Such systems may employ vision systems, infrared sensors, gyroscopic sensor and other technologies to monitor eye gaze, eye blinking/closure, head posture and other metrics of the vehicle's operator. These metrics may be used in determining vehicle operator distraction, drowsiness, fatigue and the like.

SUMMARY

In one exemplary embodiment, an apparatus may include a host vehicle having host vehicle kinematic information and an adjacent vehicle monitoring module receiving host vehicle kinematic information and target vehicle kinematic information corresponding to a target vehicle. The adjacent vehicle monitoring module may include a belief tracker module producing a measure of distraction of an operator of the target vehicle based upon host vehicle kinematic information and target vehicle kinematic information. The apparatus may include an executive module invoking a response based upon the measure of distraction of the operator of the target vehicle.

In addition to one or more of the features described herein, the adjacent vehicle monitoring module may further include a behavioral metric determination module receiving categorical inputs comprising host vehicle kinematic information and target vehicle kinematic information. The behavioral metric determination module may derive behavioral metrics related to the target vehicle from the categorical inputs and provide the behavioral metrics to the belief tracker module.

In addition to one or more of the features described herein, the belief tracker module may include at least one of a Bayesian classifier and a Naïve Bayes classifier.

In addition to one or more of the features described herein, the adjacent vehicle monitoring module may further include a behavioral threat assessment module receiving the measure of distraction of the operator of the target vehicle and producing a threat assessment based upon the measure of distraction. The executive module may receive the threat assessment and invoke a response based upon the threat assessment.

In addition to one or more of the features described herein, the categorical inputs may further include lane metrics and driving environment information.

In addition to one or more of the features described herein, the host vehicle may further include at least one of an external object sensor and a V2X communications system wherein target vehicle kinematic information may be received by the host vehicle from at least one of an external object sensor and a V2X communications system.

In addition to one or more of the features described herein, the belief tracker module may receive temporal driving environment information and may produce the measure of distraction of the operator of the target vehicle further based upon temporal driving environment information.

In addition to one or more of the features described herein, the behavioral threat assessment module may receive host vehicle kinematic information, target vehicle kinematic information, lane metrics and driving environment information and may produce the threat assessment further based upon host vehicle kinematic information, target vehicle kinematic information, lane metrics and driving environment information.

In addition to one or more of the features described herein, the adjacent vehicle monitoring module may further include a reference frame conversion module converting target vehicle kinematic information to a global reference frame.

In addition to one or more of the features described herein, the measure of distraction may include a probabilistic belief.

In addition to one or more of the features described herein, the threat assessment may be produced based upon comparisons of the measure of distraction to at least one of an environmental based threshold and a severity based threshold.

In addition to one or more of the features described herein, the response invoked by the executive module may include at least one of issuing host vehicle warnings, issuing target vehicle alerts, issue third party alerts, and invoking host vehicle assistive control.

In addition to one or more of the features described herein, the measure of distraction may include at least one of a visual-manual distraction, cognitive distraction, emotional distraction, drowsy distraction, and impaired distraction.

In another exemplary embodiment, an apparatus may include a host vehicle providing host vehicle kinematic information wherein the host vehicle may include an external object sensor providing target vehicle kinematic information. The apparatus may further have a behavioral metric determination module receiving categorical inputs including host vehicle kinematic information and target vehicle kinematic information wherein the behavioral metric determination module may derive behavioral metrics related to the target vehicle from the categorical inputs. The apparatus may further have a belief tracker module receiving the behavioral metrics wherein the belief tracker module may provide a measure of a categorical distraction based upon a subset of the behavioral metrics. The apparatus may further have a behavioral threat assessment module receiving the measure of the categorical distraction and producing a threat assessment based upon the measure of the categorical distraction. The apparatus may further have an executive module invoking a response based upon the threat assessment.

In addition to one or more of the features described herein, the belief tracker module may receive temporal driving environment information and may produce the measure of the categorical distraction further based upon temporal driving environment information.

In addition to one or more of the features described herein, the behavioral threat assessment module may receive host vehicle kinematic information, target vehicle kinematic information, lane metrics and driving environment information and may produce the threat assessment further based upon host vehicle kinematic information, target vehicle kinematic information, lane metrics and driving environment information.

In yet another exemplary embodiment, a method may include receiving kinematic information corresponding to a target vehicle and a host vehicle, deriving behavioral metrics related to the target vehicle based upon the kinematic information, providing measures of categorical distractions based upon subsets of the behavioral metrics, analyzing the measures of categorical distractions and producing behavioral risk evaluation information, receiving the behavioral risk evaluation information and determining a target vehicle to host vehicle threat assessment, and based upon the threat assessment, invoking a response from the host vehicle.

In addition to one or more of the features described herein, receiving kinematic information corresponding to the target vehicle may include receiving kinematic information from the target vehicle via at least one of a V2X transfer and an external object sensor on the host vehicle.

In addition to one or more of the features described herein, deriving behavioral metrics related to the target vehicle may further be based upon lane metrics and driving environment information.

In addition to one or more of the features described herein, providing measures of categorical distractions based upon subsets of the behavioral metrics may include receiving subsets of the behavioral metrics at Naïve Bayes classifiers and providing from the Naïve Bayes classifiers probabilistic beliefs of categorical distractions.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

During roadway operation of a vehicle by a vehicle operator, semi-autonomously or fully-autonomously, the vehicle may be an observer in a driving scene which includes a driving environment including, for example the roadway and its features, limits, condition and characteristics, surrounding infrastructure, objects, signs, hazards and other vehicles sharing the roadway. An observing vehicle may be referred to herein as a host vehicle. Other vehicles sharing the roadway may be referred to herein as target vehicles.

Figure 1:
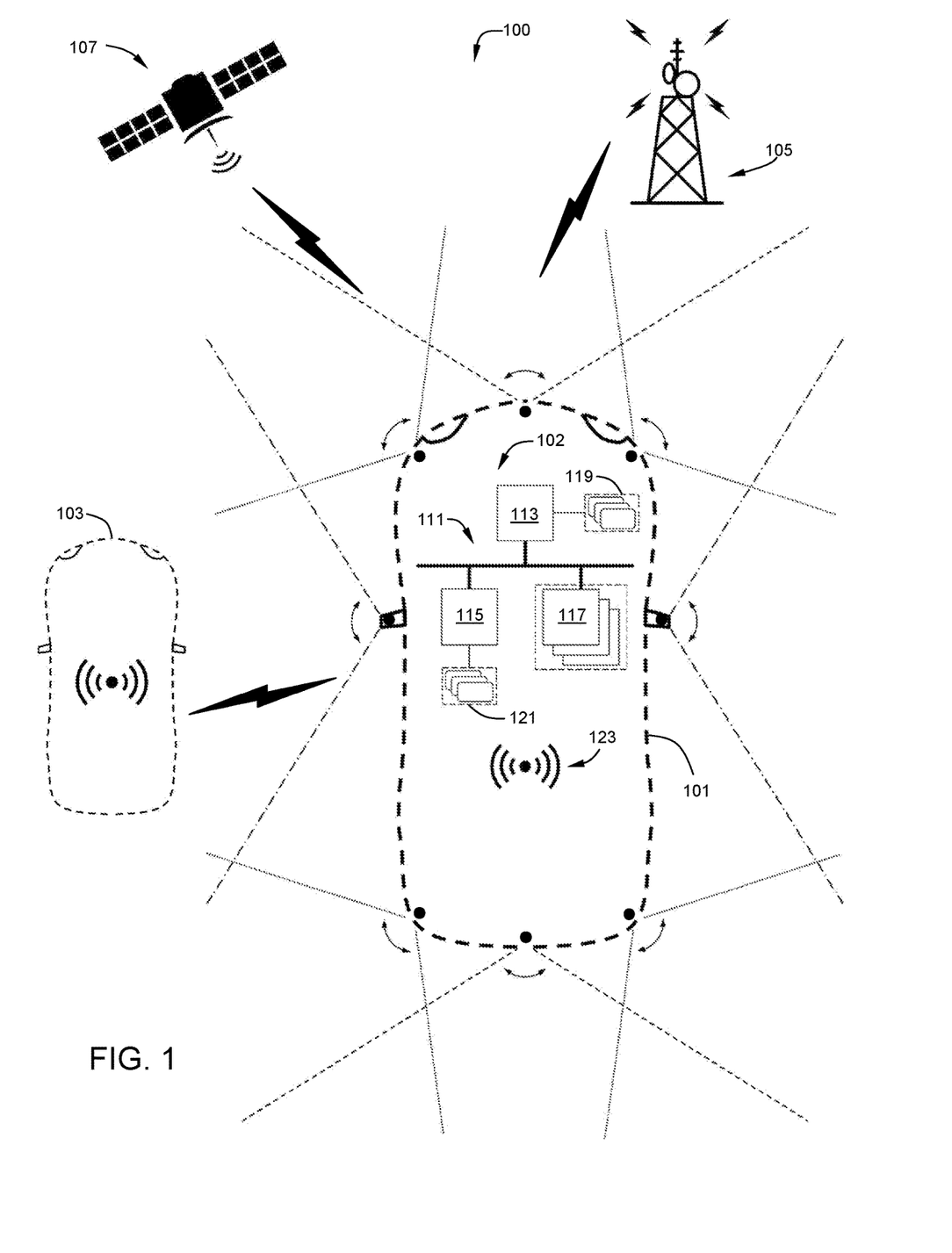
FIG. 1 illustrates an exemplary host vehicle, target vehicle and system related to target vehicle behavioral monitoring by the host vehicle, in accordance with the present disclosure.

A host vehicle may be equipped with various sensors and communication hardware and systems. An exemplary host vehicle 101 is shown in FIG. 1 which illustrates an exemplary system 100 for target vehicle behavioral monitoring, in accordance with the present disclosure. Host vehicle 101 may be a non-autonomous vehicle or an autonomous or semi-autonomous vehicle. The term "autonomous or semi-autonomous vehicle," may include any vehicle capable of automatically performing a driving-related action or function, without a vehicle operator request, or in response to a vehicle operator executive request or confirmatory response, and may include actions falling within levels 1-5 of driving automation standards of the Society of Automotive Engineers (SAE). Host vehicle 101 may include a control system 102 including a plurality of networked electronic control units (ECUs) which may be communicatively coupled via a bus structure 111 to perform control functions and information sharing, including executing control routines locally or in distributed fashion. Bus structure 111 may be a part of a Controller Area Network (CAN), or other similar network, as is well known to those having ordinary skill in the art. Vehicle networks may be wired, wireless or a combination thereof. One exemplary ECU may include an engine control module (ECM) 115 primarily performing functions related to internal combustion engine monitoring, control and diagnostics based upon a plurality of inputs 121. While inputs 121 are illustrated as coupled directly to ECM 115, the inputs may be provided to or determined within ECM 115 from a variety of well-known sensors, calculations, derivations, synthesis, other ECUs and sensors over the bus structure 111 as well understood by those having ordinary skill in the art. Host vehicle 101 bus data of particular interest in the present disclosure may include various vehicle kinematic data. Other ECUs 117 may be part of the network of controllers onboard the host vehicle 101 and may perform functions related to various other vehicle systems and operations (e.g. chassis, steering, braking, stability control, transmission, communications, infotainment, vehicle autonomous driving, etc.). A variety of host vehicle 101 related information may be commonly available and accessible to all networked ECUs, for example, vehicle dynamic and kinematic information such as speed, heading, steering angle, multi-axis accelerations and jerks, yaw, pitch, roll, etc. Another exemplary ECU may include an external object calculation module (EOCM) 113 primarily performing functions related to sensing the environment external to the vehicle 101 and, more particularly, related to roadway lane, pavement and object sensing. In addition to host vehicle 101 information, EOCM 113 may receive information from a variety of external object sensors 119 and other sources. By way of example only and not of limitation, EOCM 113 may receive information from one or more radar system, lidar system, ultrasonic system, vision system, global positioning system (GPS), geographic information system (GIS), vehicle-to-vehicle communication system, and vehicle-to-infrastructure communication systems, as well as from on or off-vehicle databases, for example map and infrastructure databases. EOCM 113 may therefore have access to position data, range data, rate data, and image based data which may be useful in the determination of roadway and target vehicle information, for example, roadway features, limits, condition and characteristics and target vehicle location, distance and velocity information, among others. External object sensors 119 may be positioned at various perimeter points around the vehicle including front, rear, corners, sides etc. as shown in the vehicle 101 by large dots at those positions. External object sensors 119 may effectively cover the entire region surrounding a vehicle or may selectively cover predetermined regions of interest. External object sensors 119 may be coupled as discrete inputs to EOCM 113 as illustrated, or may provide data to EOCM 113 over the bus structure 111 as well understood by those having ordinary skill in the art. Host vehicle 101 may be equipped with wireless communication capabilities shown generally at 123 which may be capable for one or more of GPS satellite 107 communications, vehicle-to-vehicle (V2V) and vehicle-to-infrastructure (V2I) communications though known ad-hoc networking, vehicle-to-pedestrian (V2P) communication, vehicle-to-cloud (V2C) communications such as through terrestrial radio (e.g. cellular) towers 105, or vehicle-to-everything (V2X) communications. In the present disclosure, reference to V2X is understood to mean any one or more wireless communication capabilities connecting a vehicle to resources and systems off-board the vehicle including but not limited to V2V, V2I, V2P, V2C. The description herein of the exemplary system 100 for target vehicle behavioral monitoring is not intended to be exhaustive. Nor is the description of the various exemplary systems to be interpreted as being wholly required. Thus, one having ordinary skill in the art will understand that some, all and additional technologies from the described exemplary system 100 may be used in various implementations of target vehicle behavioral monitoring in accordance with the present disclosure.

Figure 2:
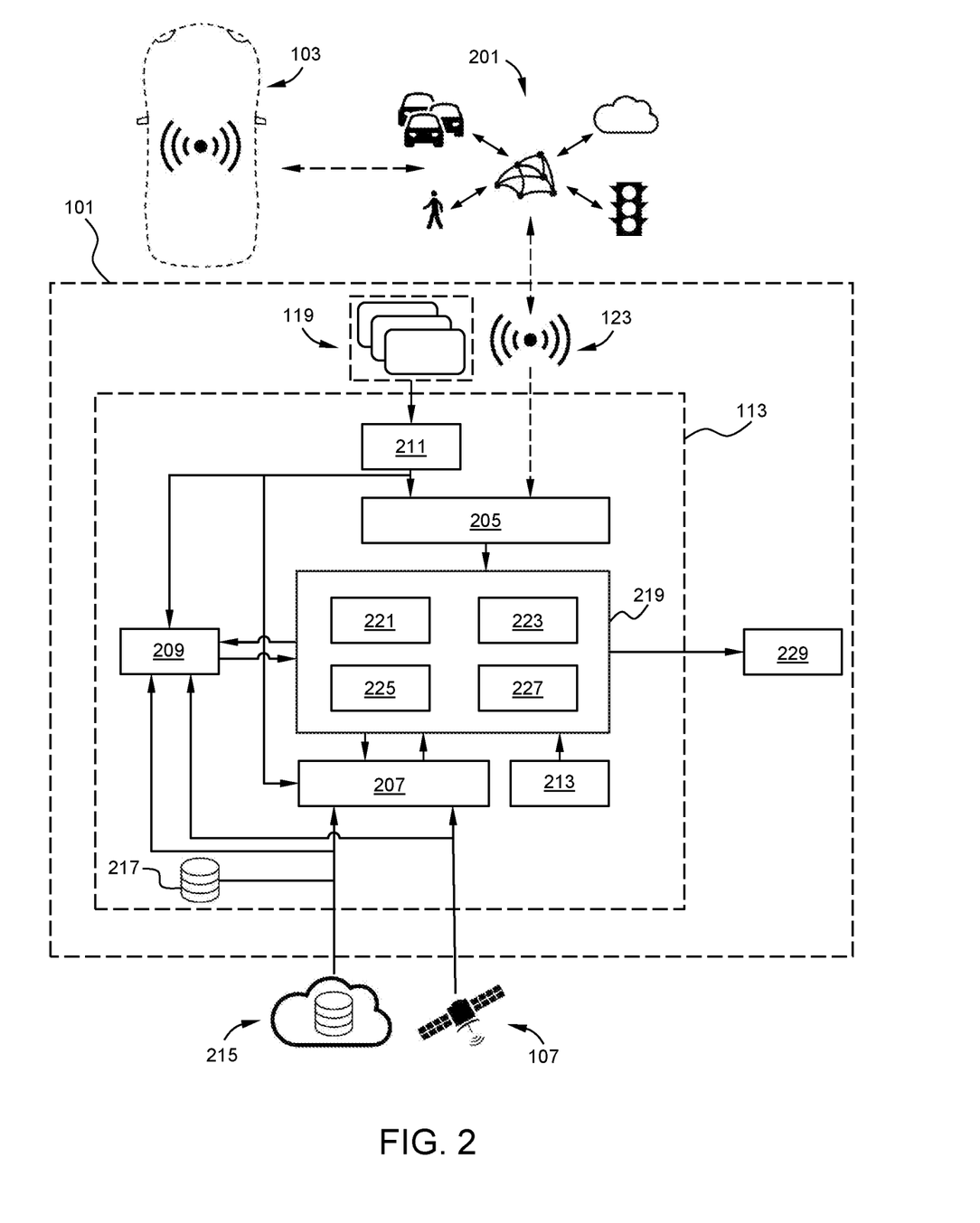
FIG. 2 illustrates a more detailed view of the system of FIG. 1, in accordance with the present disclosure.

Referring to FIG. 2, portions of system 100 from FIG. 2 for target vehicle 103 behavioral monitoring by host vehicle 101, including EOCM 113, are illustrated in additional detail. EOCM 113 may include an adjacent vehicle monitoring module 219 for performing functions related to monitoring, analyzing and acting upon the behavior of target vehicles. Functions performed by the adjacent vehicle monitoring module 219 may include determining a measure of distraction of the operator of the target vehicle 103, characterizing the type or category of distraction (e.g. visual-manual, cognitive, emotional, drowsy, impaired), determining level of risk that the target vehicle poses, and invoking various responses including host vehicle notifications and evasive actions and external notification and information sharing. Categorical distractions may include the examples of visual-manual, cognitive, emotional, drowsy, and impaired distraction. Additional or alternative categorical distractions may include others not set forth herein but which may be apparent to one having ordinary skill in the art, for example through human/machine interaction studies, other empirical methods or intuitive discernment. As few as one of the categorical distractions may be employed in accordance with the present disclosure.

Visual-manual distractions may be characterized by tasks performed by an operator that require a combination of both visually looking at the task item while physically interacting with the task item that divert attention away from the primary task (in this case driving). Non exhaustive examples may be texting, reading, eating, or interacting with vehicle interface/radio/HVAC controls. When this distraction is performed for some time, the operator's behavior begins to manifest in their vehicle's dynamics. Actions such as reaching/looking away from the road tend to cause the operator to drift in the direction they are looking/reaching. Similar changes also occur in vehicle speed due to foot movement away from or into the pedals. Distractions can be exclusively visual (billboards) or manual (reaching for an object without looking) and have similar effects. Cognitive distractions may be characterized by an operator thinking about a non-driving related item to the point where it infringes on the attention given to driving. Non limiting examples would be talking on the phone or daydreaming. This may cause the operator to process their environment less effectively and react more slowly. While lateral vehicle movement may characterize visual-manual distractions, cognitive distractions may manifest in the operator not reacting to the current driving environment or reacting slowly or with delay. Non limiting examples may include late braking when a preceding vehicle brakes or not taking cues from vehicles around them, signage, or their mirrors/instrument cluster. The mental task does not need to be strenuous, it just has to be thought of enough to impact the operator's performance. For example, an earache is not cognitively demanding, but any acute pain may be cognitively distracting. Emotional Distraction may be characterized by the operator being in a heightened or focused emotional state as may be induced by a personally traumatic event such as familial death, an unresolved conflict, or other personal trigger. Such heightened emotional states may result in an operator reacting in a more impulsive fashion with a less considered approach and may be characterized as aggressive or risky behavior. Drowsy distraction may be characterized simply by attention decreasing because the operator's body is trying to go to sleep. It results in poor cognitive and physical response. When it manifests it happens like visual-manual distractions and cognitive distractions all rolled into one. But it can be much more aggressive because the individual is becoming less and less capable as they drive. There may be repeated or prolonged poor behaviors such as lateral drift or not maintaining speed. Intoxicated distraction may present similarly, but the operator is awake and reacting the whole time. An intoxicated operator may behave similarly to a severely cognitively distracted operator. However, intoxicated distraction does not improve with negative reinforcements like rumble strips or a near-miss since an intoxicated operator cannot immediately improve the level of intoxication.

The functions of the adjacent vehicle monitoring module 219 may be based primarily upon observed and/or provided target vehicle kinematic information and, in some embodiments, additional information such as GPS and GIS data and driving environment data. Target vehicle 103 may be subject to active or passive discernment by host vehicle 101. In one embodiment, target vehicle 103 may be actively discerned by one or more external object sensors 119 associated with host vehicle 101. Passive discernment refers to receipt of relevant information from the target vehicle 103 by the host vehicle 101 by way of V2X transfer as further discussed herein, such as directly from target vehicle 103 via V2V transfer. Generally, one skilled in the art will understand that object detection by external object sensors 119 requires a clear line of sight between host vehicle 101 and target vehicle 103 and may be constrained by the distance between the host vehicle 101 and the target vehicle 103 and, for some sensor types, constrained by the surrounding environment/weather conditions. In one embodiment, external object sensors 119 associated with host vehicle 101 may also actively discern roadway features, limits, conditions and characteristics as well as other infrastructure objects.

In accordance with the present disclosure, information of primary interest relates to position and motion of the target vehicle 103 (target vehicle kinematic information) and may be based upon external object sensors 119. Additional contextual information, for example roadway and infrastructure features, limits and characteristics (lane metrics) and driving environment data (environmental conditions), may also be desirable and may beneficially be derived based upon external object sensors 119. In one embodiment, target vehicle kinematic information module 205 may receive and derive target vehicle kinematic information from external object sensors 119, including one or more of range/rate capable sensors such as radar, lidar, ultrasonic and vision sensors, that provide data directly corresponding to target vehicle 103 position and time derivatives thereof. That is, position, range, velocity, acceleration and jerk of the target vehicle 103 within the reference frame of the host vehicle 101 may be available from such range/rate capable sensors. Additionally, it is known that range/rate sensors may also provide target vehicle yaw rate, also within the reference frame of the host vehicle 101. External object sensors 119 preferably provide position, range, velocity, acceleration and jerk of the target vehicle 103 in vehicle standard longitudinally (X) and laterally (Y) resolved components. Otherwise, such resolving may be performed in downstream sensor processing module 211. Depending upon the degree of "at sensor" signal processing, downstream sensor processing module 211 may include various filtering. Additionally, where external object sensors 119 are numerically and/or topologically manifold, downstream sensor processing module 211 may include sensor fusing. Thus, it is appreciated that target vehicle kinematic information may include: target vehicle 103 longitudinal position ($V_tP_x$), velocity ($V_tV_x$) and acceleration ($V_tA_x$); target vehicle 103 lateral position ($V_tP_y$), velocity ($V_tV_y$) and acceleration ($V_tA_y$); and target vehicle yaw rate ($V_t\dot{\Psi}$). Also within the reference frame of the host vehicle 101, bus data from host vehicle 101 may provide host vehicle kinematic information module 213 with host vehicle kinematic information including: host vehicle 103 longitudinal position ($V_hP_x$), velocity ($V_hV_x$) and acceleration ($V_hA_x$); host vehicle 103 lateral position ($V_tP_y$), velocity ($V_hV_y$) and acceleration ($V_hA_y$); and host vehicle yaw rate ($V_h\dot{\Psi}$). Vehicle roll, pitch and vertical based information may also be included.

In another embodiment, host vehicle 101 and target vehicle 103 may be V2X 201 capable allowing for the transmission of relevant information from the target vehicle 103 for receipt by the host vehicle 101 utilizing, for example, dedicated short-range communications (DSRC). Thus, target vehicle 103 may provide the target vehicle kinematic information, including $V_tP_x$, $V_tV_x$, $V_tA_x$, $V_tP_y$, $V_tV_y$, $V_tA_y$, and $V_t\dot{\Psi}$, vis-à-vis V2X communication of the target vehicle 103 bus data. It is appreciated, therefore, that the target vehicle kinematic information provided from the target vehicle 103 bus data is within the reference frame of the target vehicle 103. One having ordinary skill in the art will recognize that V2X information transfer may be directly between vehicles or via one or more other neighboring nodes (surrounding vehicles or infrastructure) through a V2V mesh network. Similarly, one having ordinary skill in the art will recognize that V2X information transfer may be by way of V2C routed communication, which may include additional cloud resources and data enhancement and processing as well as extend the communication distance between host vehicles 101 and target vehicles 103. In addition to the exemplary kinematic information set forth above for each of the target vehicle 103 and the host vehicle 101, the respective kinematic information modules 205, 213 may derive and provide common time and sample dependent statistical measures of the information including, for example, means, ranges and standard deviations among others. Such statistical, derived, dependent or related information is understood to be included in any reference to kinematic information.

Target vehicle kinematic information may be provided to adjacent vehicle monitoring module 219. Similarly, host vehicle kinematic information may also be provided to adjacent vehicle monitoring module 219. Adjacent vehicle monitoring module 219 may include a reference frame conversion module 221 for converting the target vehicle kinematic information discerned from external object sensors 119 to a target vehicle 103 reference frame based upon the target vehicle kinematic information and the host vehicle kinematic information. Thus, the adjacent vehicle monitoring module 219 may provide and further process target vehicle kinematic information that is independent of the host vehicle 101 motion. Alternatively or additionally, both the target vehicle kinematic information and the host vehicle kinematic information may be converted to a global reference frame as desired or beneficial for additional processing. For instance, the variation in motion of the host vehicle may be eliminated if target vehicle motion with respect to a global reference frame such as the road's primary direction is utilized. For purposes of this disclosure, further references to target vehicle kinematic information may be with respect to any valid reference frame.

Lane metrics module 207 may be tasked with determining lane metrics including lane limits and width in the vicinity of the target vehicle 103. Lane limits and width may be derived by vision sensor data when available from external object sensors 119 on the host vehicle 101. It is known, for example, that vision sensors may discern roadway lanes. Additional information may contribute to robustness in discerning roadway lanes. For example, GPS data from GPS satellites 107 in conjunction with map and other GIS data which may be provided from cloud-based GIS databases 215 or on-vehicle databases 217 may contribute to robust determinations of lane limits and width by lane metrics module 207. Moreover, V2I communications may provide direct lane limit information via infrastructure lane markers. Target vehicle 103 lateral position $V_tP_y$ may be provided to lane metrics module 207 for additional determinations of target vehicle 103 distance to lane lines and target vehicle 103 lane crossings.

Environmental conditions module 209 may be tasked with providing driving environment information to the host vehicle 101. Driving environment information may further be divided into static or quasi-static (hereafter static) driving environment information (e.g. geographic, road, infrastructure, speed limits, and time of day) and temporal or situational (hereafter temporal) driving environment information (e.g. weather and related road conditions/visibility, traffic conditions/behavior, adjacent and host vehicle distraction/behavior). Environmental conditions module 209 may rely upon host vehicle 101 bus data and sensors as well as off-vehicle sources. For example, certain visibility conditions may be inferred from ambient light sensing, headlight/foglight use, wiper use and rain sensing, etc. Additional information based upon GPS data from GPS satellites 107 in conjunction with map and other GIS data which may be provided from cloud-based GIS databases 215. For example, localized weather information including fog, precipitation, and other weather influencing conditions affecting visibility may beneficially be provided based upon available GIS data sources. As well, posted speed limits and road grades may be available vis-à-vis GPS and GIS data, vision sensor data, or other. Moreover, V2V and V2I communications may inform the host vehicle 101 of visibility conditions with additional granularity, for example localized fog patches and unlit road segments. Traffic congestion, speed metrics, traffic jams, temporal and static road hazards such as disabled vehicles, potholes, detours, and lane closures among other driving environment information may similarly be provided to the host vehicle 101 via V2X communications. Both static and temporal varieties of driving environment information may have utility within adjacent vehicle monitoring module 219; however, both varieties may find utility at different process nodes as will be apparent with further disclosure herein.

Adjacent vehicle monitoring module 219 may further include a behavioral metric determination module 223, a belief tracker module 225, and a behavioral threat assessment module 227. Executive module 229 receives a threat assessment output from the behavioral threat assessment module 227 of the adjacent vehicle monitoring module 219 for invoking one or more appropriate actions. Generally, the adjacent vehicle operator module 219 may estimate how likely it is at a given time stamp that the target vehicle 103 is distracted based upon a dynamic state derived from metrics collected at that time stamp and prior. The state is updated to determine the probability that the vehicle operator is presently distracted. Recognizing that different distractions manifest differently, various metrics may be used to track beliefs of whether the target vehicle 103 is distracted in a unique manner, and determine therefrom what kind of threat might be posed. For example, an emotionally distracted vehicle operator may be more likely to drive aggressively or offensively. A behavioral threat assessment may be made based upon the probabilistic beliefs of categorical distractions, and determinations performed of the nature of the threat posed and what and whether any executive actions may be taken.

Figure 3:
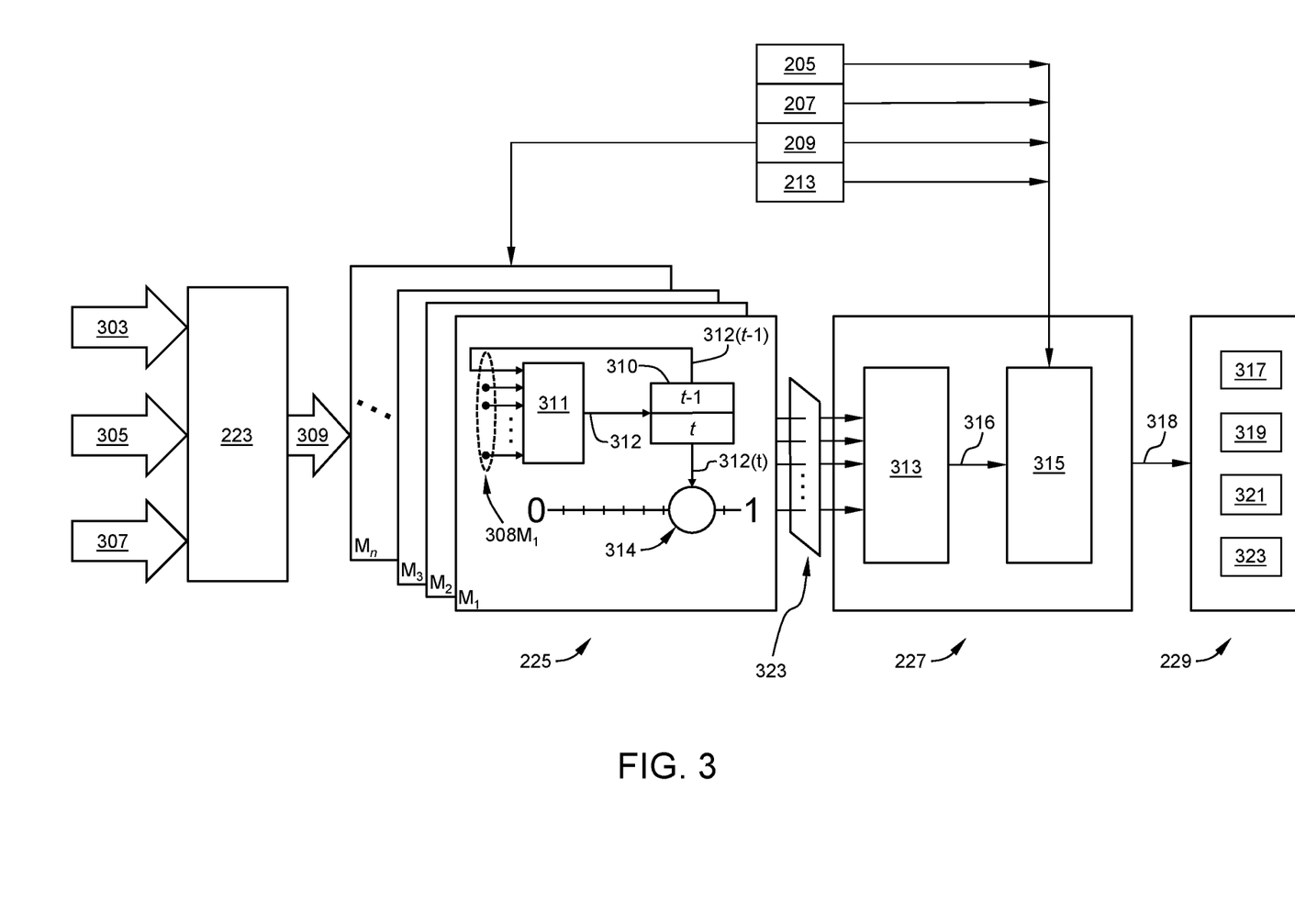
FIG. 3 illustrates embodiments in extended detail of portions of the system of FIG. 1 and FIG. 2, in accordance with the present disclosure.

FIG. 3 illustrates a detailed view of one embodiment of the behavioral metric determination module 223, the belief tracker module 225, and the behavioral threat assessment module 227 of the adjacent vehicle monitoring module 219 set forth herein with respect to FIG. 2. At the left of FIG. 3, categorical inputs 303, 305, 307 to the behavioral metric determination module 223 are shown. Inputs 303 may correspond to target vehicle kinematic information and host vehicle kinematic information as previously set forth herein with respect to target vehicle kinematic information module 205 and target vehicle kinematic information module 213 of FIG. 2. Inputs 305 may correspond to lane metrics as previously set forth herein with respect to lane metrics module 207 of FIG. 2. Similarly, inputs 307 may correspond to driving environment information as previously set forth herein with respect to environmental conditions module 209 of FIG. 2. More particularly, inputs 307 may correspond to static driving environment information (e.g. geographic, road, infrastructure, speed limits). Behavioral metric determination module 223 may operate upon the categorical inputs 303, 305, 307 to derive therefrom a plurality of behavioral metrics 309 that relate individual or combinations of observed or provided target vehicle kinematic information, lane metrics and driving environment information to indicators of target vehicle 103 operator distraction. Behavioral metrics 309 may be expressed as normalized scalars of substantially continuous or discretized values. Categorical inputs 303, 305, 307 may be subject to data filtering, for example to ensure rational data and smoothing as well as averaging data or provision of data duration information. For example, target vehicle 103 lane crossing frequency or deviation of lane position (e.g. standard deviation in a vehicle's lateral position relative to the center of its lane over a period of time) may be calculated based upon target vehicle 103 lane crossing events or a record of the vehicle's position filtered with one or more different time constants since different time constants may be relevant to different types or categories of distractions. Visual-manual distractions may correlate strongly to frequent lane crossings or deviation in lane position during shorter time constants, whereas drowsy distractions may correlate to infrequent lane crossings or larger deviation in lane position over more extended time constants. Thus, visual-manual distraction probability generally may increase with frequent lane crossings or deviation in lane position in a given time frame. More complex behavioral metrics 309 may be determined. For example, an indication of the amount of energy the target vehicle 103 operator puts into steering corrections (steering entropy) may be determined from such inputs as target vehicle 103 large and frequent lateral velocity events and/or large and frequent yaw rates. Thus, increasing levels and frequency of steering corrections may reflect increasing probability of visual-manual distraction. Whereas steering entropy may relate to temporal corrective events, another exemplary behavioral metric may relate to lateral variance over longer periods of time and be useful in the probability prediction of certain target vehicle 103 operator distractions. For example, based on standard deviations of the target vehicle 103 lateral position and velocity, one or more lateral variance metrics may be obtained. Whereas larger variances in lateral velocity coupled with larger variances in lateral position may indicate higher probability of visual-manual distraction, smaller variances in lateral velocity coupled with larger variances in lateral position may more likely indicate higher probability of an operator executing a lane change or of a drowsy operator. Other behavioral metrics 309 may be determined within the constraints of the of categorical inputs 303, 305, 307 and others as may be apparent to one having ordinary skill in the art. Additional non-limiting examples include projected time to collision, comparatives such as target vehicle 103 longitudinal velocity relative to posted speed limits or the traffic herd speed (e.g. average speed of nearby vehicles), deviation measures of target vehicle 103 longitudinal velocity, accelerator pedal release time or entropy, brake pedal release time or entropy, target vehicle 103 accelerator and or brake entropy which may be determined from active discernment or passive discernment techniques. Projected time to collision less than a threshold which may be a function of vehicle speed, for example, may indicate higher probability of visual-manual distraction. Alternatively or additionally, where a predetermined fraction of multiple vehicle closing events (i.e. projected collisions) have a projected time to collision less than a function of vehicle speed, for example, may also indicate higher probability of visual-manual distraction. Other behavioral metrics 309 may be apparent to one having ordinary skill in the art. Those detailed herein are offered merely by way of non-limiting examples.

Behavioral metrics 309 pass to the belief tracker module 225 whereat they may be subject to data filtering as well known to those having ordinary skill in the art. In one embodiment, temporal driving environment information (e.g. weather and related road conditions/visibility, traffic conditions/behavior, adjacent and host vehicle distraction/behavior) from environmental conditions module 209 of FIG. 2 may pass to the belief tracker module 225 in similar fashion and for use as behavioral metrics 309. In one embodiment, the belief tracker module 225 may include one or more classifier modules ($M_1$, $M_2$, $M_3$, ... $M_n$) corresponding to respective categorical distractions (e.g. visual-manual, cognitive, emotional, drowsy, impaired). In one embodiment, the classifier modules may employ probabilistic classifiers of a respective categorical distraction based upon some or all of the behavioral metrics 309. Thus, each individual classifier module may include a respective classifier and receive as inputs thereto a respective subset of the behavioral metrics 309, which may be referred to as a classifier input matrix of behavioral metrics, or simply classifier input matrix 308. The classifier module ($M_1$, $M_2$, $M_3$, ... $M_n$) may therefore provide belief outputs 323 that are a measure of categorical distractions based upon subsets of the behavioral metrics.

In an exemplary classifier module $M_1$, in one embodiment, the classifier input matrix $308M_1$ may be constructed from a subset of the behavioral metrics 309. In one embodiment, classifier module $M_1$ may include a Bayesian classifier 311 with a corresponding raw classifier output 312. Alternative embodiments may include a Support Vector Machine (SVM) or an Artificial Neural Network (ANN) to perform the same functions. It may be beneficial, considering on-vehicle data processing resources and the desire to reduce informational latency, that Bayesian classifier 311 may be a Naïve Bayes classifier, wherein one having ordinary skill in the art recognizes an assumption of conditional independence of the individual behavior metrics of the classifier input matrix $308M_1$ may substantially reduce implementation overhead both on-vehicle and during training. The raw classifier output 312 may be a probability that the vehicle operator of the target vehicle 103 is distracted. The classifier output 312 may be time averaged or otherwise filtered 310 to provide a current classifier output $312(t)$ and an a priori classifier output $312(t-1)$. The a priori classifier output $312(t-1)$ may be fed back as one of the behavioral metrics of the classifier input matrix $308M_1$. The current classifier output $312(t)$ updates a probabilistic belief 314 of classifier module $M_1$ between 0—Not Distracted and 1—Distracted. Thus, the probabilistic belief 314 of classifier module $M_1$ provides smooth and stable measure of distraction with proper inertial performance at belief output 323. In another embodiment, with additional post processing such as threshold comparison of the probabilistic belief 314, belief output 323 may be simplified to a binary state of vehicle operator distraction (i.e. 0—Not Distracted or 1—Distracted) relative to the respective categorical distraction.

Belief tracker module 225 may pass belief outputs 323 from respective one or more classifier module ($M_1$, $M_2$, $M_3$, ... $M_n$) to behavioral threat assessment module 227 for further operations related to, for example, risk evaluation/quantification based on individual and/or collective analysis of the belief outputs 323 to produce behavioral risk evaluation information 316. The belief outputs 323 may be received by distraction evaluation module 313 whereat, for example, threshold comparisons to individual belief outputs may eliminate further consideration of the corresponding categorical distraction (e.g. visual-manual, cognitive, emotional, drowsy, impaired), designate it as a threat, or further quantify it based on magnitude (e.g. low, medium, high threat levels). Alternatively or additionally, comparisons of individual belief outputs may be made relative to one another for prioritizations of actionable distractions. Moreover, combinations of individual belief outputs may be analyzed to determine actionable combinations of categorical distractions that individually may not be considered actionable. Such preceding examples are not limiting, with others being apparent to those having ordinary skill in the art.

The distraction evaluation module 313 may pass the behavioral risk evaluation information 316 to threat rating module 315 whereat, for example, the threat assessment output 318 may be determined, including a threat rating of the target vehicle 103 to the host vehicle 101. In one embodiment, modules 205, 207, 209 and/or 213 may provide the threat rating module 315 with their respective information. Kinematic information modules 205, 213 may provide the threat rating module 315 with target vehicle kinematic information and host vehicle kinematic information, respectively, as previously described herein in detail with reference to FIG. 2. Lane metrics module 207 may provide the threat rating module 315 with lane metrics including lane limits and width as previously described herein in detail with reference to FIG. 2. Environmental conditions module 209 may provide the threat rating module 315 with static driving environment information (e.g. geographic, road, infrastructure, speed limits) and/or temporal driving environment information (e.g. weather and related road conditions/visibility, traffic conditions/behavior, adjacent and host vehicle distraction/behavior). The threat rating module 315 may use the behavioral risk evaluation information 316 together with the various kinematic information, lane metrics and driving environment information to evaluate, for example, whether the behavior may be discounted or its importance elevated due to circumstances, conditions or the situational exigency. For example, certain environmental conditions (e.g. weather and visibility) may suggest a reasonable expectation that the target vehicle 103 operator would exhibit behavior presenting as certain categorical distractions, and thus lowering the threat rating which suggests the target vehicle 103 behavior may be ignored or responses thereto attenuated. Certain severity metrics may also be used in determining the host vehicle 101 response. For example, host vehicles 101 that are in a target vehicle's blind spot in an immediately adjacent lane wherein the target vehicle 103 is exhibiting a categorical distraction characterized by lane crossings or deviation in lane position may be considered critical thus raising the threat rating, whereby some avoidance maneuver on the part of the host vehicle 101 may be prudent. Or, a target vehicle 103 exhibiting a categorical distraction and a trajectory toward collision with the host vehicle 101 may raise the threat rating suggesting an avoidance maneuver on the part of the host vehicle 101, whereas a trajectory of the target vehicle 103 away from the host vehicle 101 may instead lower the threat rating suggesting a lesser response such as an informational warning to the host vehicle 101 operator. Similarly, proximity of the target vehicle 103 to the host vehicle 101 may either elevate or attenuate the threat rating of the target vehicle 103. Thus, the threat rating module 315 may compare the threat level for each categorical distraction to one or more thresholds that have been established for each categorical distraction. Each categorical distraction may have multiple thresholds, for example: one for dry daylight conditions, one for wet daylight conditions, one for icy/snowy daylight conditions, one for dry night conditions, one for wet night conditions, and one for icy/snowy night conditions. Each categorical distraction may also have different thresholds for different severities of distraction. The threat assessment output 318 may then be determined relative to these thresholds. Such preceding examples are not limiting, with others being apparent to those having ordinary skill in the art.

The behavioral threat assessment module 227 may pass the threat assessment output 318 to executive module 229 whereat, for example, responses to the target vehicle 103 behavior may be invoked which are situationally and opportunistically appropriate to the threat assessment output 318 and consistent with the capabilities of the host vehicle 101. For example, a first class of host vehicle 101 capabilities 317 may issue warnings to the host vehicle 101 operator such as visually displayed lights, icons, graphics, written word messages, etc. upon instrument panel displays, screens, head up displays, and others. Warnings may also be audible, including tones, alarms, patterns and spoken works. Haptic devices may also be employed for tactile warnings on the steering wheel and seating areas. Such warning may convey to the operator of the host vehicle 101 the presence of an assessed threat, level of risk, location or suggested course of action among other information. A second class of host vehicle 101 capabilities 319 may issue alerts to the operator of the target vehicle 103 such as horn honking and light flashing including forward lamps, corner marker lamps, brake lamps and others in appropriate patterns, frequency, intensity or colors. Additional target vehicle 103 operator warnings may be by way of V2X communication origination from the host vehicle 101 of any variety of warning or alert as set forth herein with respect to the first class of host vehicle 101 capabilities 317. A third class of host vehicle 101 capabilities 321 may communicate relevant information to vehicles other than the target and host within a predetermined range or related roadway, or to third parties and service providers. Law enforcement personnel and highway patrol services may also be contacted as appropriate. Such communication may be by way of V2X communications originating with or requested by the host vehicle 101, including through third party service providers such as OnStar®. A fourth class of host vehicle 101 capabilities 323 may invoke, for example, different levels of assistive controls of host vehicle 101 systems to avoid situations, prepare for and mitigate imminent collisions. For example, through autonomous or semi-autonomous vehicle system controls, host vehicle 101 braking, propulsion, steering, occupant protection or route planning and execution systems may be called upon to increase separation of the host vehicle 101 and the target vehicle 103, avoid collision paths, take evasive actions, cancel or modify routes or maneuvers or prepare for imminent collision, among other tasks. The exemplary classes of host vehicle 101 capabilities may not be exhaustive, nor are the particular examples within each class. The exemplary classes of host vehicle 101 capabilities may not be mutually exclusive, and a host vehicle 101 may be capable in all or some of the classes. In the executive module 229, the threat assessment output can be compared to one or more thresholds to determine what if any actions 317, 319, 321, 323 are taken. For example, reacting more preemptively if alerting the driver, or being more confident before adjusting route planning. These thresholds could be the same or different than the thresholds used in the behavioral threat assessment module 227.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An apparatus, comprising:
a host vehicle comprising host vehicle kinematic information;
an adjacent vehicle monitoring module comprising a behavioral metric determination module a belief tracker module and a behavioral threat assessment module, the behavioral metric determination module receiving categorical inputs comprising host vehicle kinematic information, target vehicle kinematic information corresponding to a target vehicle, lane metrics and driving environment information, the behavioral metric determination module deriving behavioral metrics related to the target vehicle from the categorical inputs and providing the behavioral metrics to the belief tracker module, the belief tracker module including a plurality of classifier modules corresponding to respective categorical distractions including a visual-manual distraction, a cognitive distraction, an emotional distraction, a drowsy distraction, and an impaired distraction, each of the plurality of classifier modules receiving a respective subset of the behavioral metrics and providing a respective measure of distraction of an operator of the target vehicle corresponding to a respective one of the visual-manual distraction, the cognitive distraction, the emotional distraction, the drowsy distraction, and the impaired distraction, the behavioral threat assessment module receiving the respective measures of distraction of the operator of the target vehicle and producing a threat assessment based upon the respective measures of distraction; and an executive module receiving the threat assessment and invoking a response based upon the threat assessment.

2. The apparatus of claim 1, wherein the belief tracker module comprises at least one of a Bayesian classifier and a Naïve Bayes classifier.

3. The apparatus of claim 1, wherein the behavioral threat assessment module receives host vehicle kinematic information, target vehicle kinematic information, lane metrics and driving environment information and produces the threat assessment further based upon host vehicle kinematic information, target vehicle kinematic information, lane metrics and driving environment information.

4. The apparatus of claim 1, wherein the threat assessment is produced based upon comparisons of the measures of distraction to at least one of an environmental based threshold and a severity based threshold.

5. The apparatus of claim 1, wherein the host vehicle further comprises at least one of an external object sensor and a V2X communications system, and wherein target vehicle kinematic information is received by the host vehicle from the target vehicle via at least one of the external object sensor and the V2X communications system.

6. The apparatus of claim 1, wherein the belief tracker module receives temporal driving environment information and produces the measures of distraction of the operator of the target vehicle further based upon temporal driving environment information.

7. The apparatus of claim 1, wherein the adjacent vehicle monitoring module further comprises a reference frame conversion module converting target vehicle kinematic information to a global reference frame.

8. The apparatus of claim 1, wherein the measures of distraction comprise probabilistic beliefs.

9. The apparatus of claim 1, wherein the response invoked by the executive module comprises at least one of issuing host vehicle warnings, issuing target vehicle alerts, issue third party alerts, and invoking host vehicle assistive control.

10. An apparatus, comprising:
a host vehicle providing host vehicle kinematic information, the host vehicle comprising an external object sensor providing target vehicle kinematic information;
a behavioral metric determination module receiving categorical inputs comprising host vehicle kinematic information, target vehicle kinematic information, lane metrics and driving environment information, the behavioral metric determination module deriving behavioral metrics related to the target vehicle from the categorical inputs;

a belief tracker module receiving the behavioral metrics, the belief tracker module including a plurality of classifier modules corresponding to respective categorical distractions of an operator of the target vehicle including a visual-manual distraction, a cognitive distraction, an emotional distraction, a drowsy distraction, and an impaired distraction, each of the plurality of classifier modules receiving a respective subset of the behavioral metrics and providing a respective measure of a categorical distraction corresponding to a respective one of the visual-manual distraction, the cognitive distraction, the emotional distraction, the drowsy distraction, and the impaired distraction;

a behavioral threat assessment module receiving the measures of the categorical distractions and producing a threat assessment based upon the measures of the categorical distractions; and an executive module invoking a response based upon the threat assessment.

11. The apparatus of claim 10, wherein the belief tracker module receives temporal driving environment information and produces the measures of the categorical distractions further based upon temporal driving environment information.

12. A method, comprising:
receiving categorical inputs comprising kinematic information corresponding to a target vehicle and a host vehicle, lane metrics and driving environment information;
deriving behavioral metrics related to the target vehicle from the categorical inputs;
providing measures of categorical distractions of an operator of the target vehicle including a visual-manual distraction, a cognitive distraction, an emotional distraction, a drowsy distraction, and an impaired distraction based upon subsets of the behavioral metrics;
analyzing the measures of categorical distractions and producing behavioral risk evaluation information;
receiving the behavioral risk evaluation information and determining a target vehicle to host vehicle threat assessment; and
based upon the threat assessment, invoking a response from the host vehicle.

13. The method of claim 12, wherein receiving kinematic information corresponding to the target vehicle comprises receiving kinematic information from the target vehicle via at least one of a V2X transfer and an external object sensor on the host vehicle.

14. The method of claim 12, wherein providing measures of categorical distractions based upon subsets of the behavioral metrics comprises receiving subsets of the behavioral metrics at Naïve Bayes classifiers and providing from the Naïve Bayes classifiers probabilistic beliefs of categorical distractions.

* * * * *